(12) United States Patent
Narges et al.

(10) Patent No.: US 10,270,784 B1
(45) Date of Patent: Apr. 23, 2019

(54) SYSTEMS, DEVICES, SOFTWARE, AND METHODS FOR LOCATION BASED DEVICE AND APPLICATION MANAGEMENT

(71) Applicant: Cruzeiro Associates, Inc., Ellicott City, MD (US)

(72) Inventors: Eric Narges, Ijamsville, MD (US); Edward Bishop, Ellicott City, MD (US)

(73) Assignee: CRUZEIRO ASSOCIATES, INC., Hanover, MD (US)

(*) Notice: Subject to any disclaimer, the term of this patent is extended or adjusted under 35 U.S.C. 154(b) by 4 days.

(21) Appl. No.: 15/926,020

(22) Filed: Mar. 20, 2018

Related U.S. Application Data

(60) Provisional application No. 62/474,051, filed on Mar. 20, 2017.

(51) Int. Cl.
| | |
|---|---|
| *H04L 29/06* | (2006.01) |
| *H04W 48/04* | (2009.01) |
| *H04W 48/16* | (2009.01) |
| *H04W 4/50* | (2018.01) |
| *H04W 4/021* | (2018.01) |
| *H04W 12/08* | (2009.01) |

(52) U.S. Cl.
CPC ........... *H04L 63/107* (2013.01); *H04W 4/021* (2013.01); *H04W 4/50* (2018.02); *H04W 12/08* (2013.01); *H04W 48/04* (2013.01); *H04W 48/16* (2013.01)

(58) Field of Classification Search
CPC ....... H04W 48/16; H04W 48/04; H04W 4/50; H04W 4/021; H04W 12/08; H04L 63/107
USPC ................................................. 455/411
See application file for complete search history.

(56) References Cited

U.S. PATENT DOCUMENTS

| | | | |
|---|---|---|---|
| 8,359,016 | B2 | 1/2013 | Lindeman et al. |
| 8,471,701 | B2 | 6/2013 | Yariv et al. |
| 8,695,058 | B2 | 4/2014 | Batchu et al. |
| 8,811,970 | B2 | 8/2014 | Danford et al. |
| 8,812,027 | B2 | 8/2014 | Obermeyer et al. |
| 8,837,363 | B2 | 9/2014 | Jones et al. |
| 9,042,862 | B2 | 5/2015 | Rege et al. |
| 9,235,584 | B2 | 1/2016 | Batchu et al. |
| 9,306,933 | B2 | 4/2016 | Pontillo et al. |
| 9,349,018 | B1 | 5/2016 | Batchu et al. |
| 9,369,884 | B2 | 6/2016 | Jones et al. |
| 9,374,654 | B2 | 6/2016 | Lindeman et al. |

(Continued)

*Primary Examiner* — Kamran Afshar
*Assistant Examiner* — Farid Seyedvosoghi

(57) ABSTRACT

Systems, devices, software, and methods of the present invention enable users and owners/operators, such as employers, vendors, and other administrators to restrict the accessibility and use of applications residing on mobile and portable user devices, when those user devices are near or within a controlled area, such as non-residential and residential properties, and/or access a controlled network, either locally or remotely. The device management system may impose restrictions on one or more user devices that may include, for example, one or more of disabling applications, preventing applications from being enabled, deleting applications, limiting or preventing applications from being downloaded, and/or performing application inventories on the user device. When the user device is no longer in, on, and/or around their facilities and/or networks, the device management system may remove or impose the restrictions on the user device.

16 Claims, 8 Drawing Sheets

(56) References Cited

U.S. PATENT DOCUMENTS

| | | |
|---|---|---|
| 9,430,641 B1 | 8/2016 | Marion et al. |
| 9,438,635 B2 | 9/2016 | Tse |
| 9,537,869 B2 | 1/2017 | Peterson |
| 2011/0047594 A1* | 2/2011 | Mahaffey ............... G06F 21/564 726/1 |
| 2012/0129503 A1 | 5/2012 | Lindeman et al. |
| 2012/0131685 A1 | 5/2012 | Broch et al. |
| 2012/0149339 A1 | 6/2012 | Mulampaka et al. |
| 2013/0078946 A1* | 3/2013 | Pecen ................. H04L 63/0823 455/411 |
| 2014/0208397 A1* | 7/2014 | Peterson ................ G06F 21/51 726/4 |
| 2014/0366160 A1* | 12/2014 | Cohen .................... G06F 21/12 726/28 |
| 2015/0348146 A1 | 12/2015 | Shanmugam et al. |
| 2017/0026787 A1 | 1/2017 | Chow et al. |

\* cited by examiner

Initial Restrictions

Inventory

New Applications

SYSTEMS, DEVICES, SOFTWARE, AND METHODS FOR LOCATION BASED DEVICE AND APPLICATION MANAGEMENT

CROSS-REFERENCE TO RELATED APPLICATIONS

Not Applicable.

BACKGROUND OF THE INVENTION

Field of the Invention

The present invention relates in general to device management and more specifically to systems, devices, software, and methods performing location based management of devices and applications thereon.

Background Art

The proliferation of mobile electronic devices in recent years has greatly increased access to information and our ability to communicate information on a global scale. These increased capabilities have also created a wide range of challenges in addition to opportunities.

Mobile phones are the primary form of communication for many people and along with tablets and laptop computers are often necessary tools for people to conduct business and manage their personal lives. As such, it is generally necessary, or in their best interest, for employers and service providers to allow employees and customers to bring these devices into places of business.

However, the inherent capabilities of these devices also poses a risk to businesses and households as these devices can be used to 1) disseminate non-public information to third parties and 2) introduce, either intentionally or accidently, malicious software into networks and/or devices of other people.

Business and personal network operators are increasingly implementing mobile device management practices to balance the desire to allow people to use mobile devices and the increased security risk associated with the devices. Geofencing solutions have been developed that enable businesses to control the use of business applications on mobile devices to the business premises in a manner analogous to limiting the use of business applications to those fixed computing devices that are running on the network of the business. See, for example, U.S. Pat. No. 9,537,869.

Other solutions include mobile device management systems that allow network administrators to control the distribution of applications to mobile devices. See, for example, U.S. Pat. No. 9,374,654. However, controlling applications on mobile devices is a difficult task unless the devices and networks are tightly controlled or owned by the administrator, analogous to networks with fixed computing assets. As such, these systems may not adequately address the use of personal mobile devices, since most users are unlikely to allow employers or other network operators to have total control over their personal devices.

Mobile and portable devices will continue to increase functionality and new and varied applications will enable more and more capability on these devices. As such, there is a continuing need for improved systems, devices, and methods for mobile and portable device management that enable users to enjoy the enhanced capabilities of these devices, while reducing the risks associated with these devices.

BRIEF SUMMARY OF THE INVENTION

Accordingly, systems, devices, software, and methods of the present invention enable users and owners and operators, such as employers, vendors, residents, and other administrators, to employ mobile and portable device management practices that reduce potential risks associated with the use of mobile and portable user devices in, on, and around owner/operator controlled facilities and/or networks.

In various embodiments, a device management system controls the accessibility and use of applications residing on mobile and portable user devices, when those user devices are near or within a controlled area, such as non-residential and residential property, and/or access a controlled network, either locally or remotely. The device management system may impose restrictions on one or more user devices that may include, for example, one or more of disabling applications, preventing applications from being enabled, deleting applications, limiting or preventing applications from being downloaded, and/or performing application inventories on the user device. The restriction may further include disabling some application and/or application features, when the device no longer is in or near the controlled areas and/or on controlled networks. When the user device is no longer in, on, and/or around their facilities and/or networks, the device management system may remove and/or impose the application restrictions on the user device.

As may be disclosed, taught, and/or suggested herein to the skilled artisan, the present invention addresses the continuing need for systems, devices, software, and methods that enable advanced device management capabilities for user devices that are used in, on, or near controlled areas and networks.

BRIEF DESCRIPTION OF THE DRAWINGS

In the drawings and detailed description, the same or similar reference numbers may identify the same or similar elements.

DETAILED DESCRIPTION OF THE INVENTION

Device management systems, devices, software, and methods of the present invention are described herein, by way of example and otherwise, that enable owners/operators to reduce potential risks associated with the use of mobile and portable devices in, on, and around their facilities and/or networks by actively managing the applications available for use on mobile and portable user devices, while the user device is in, on, and around controlled areas and networks.

Figure 1:
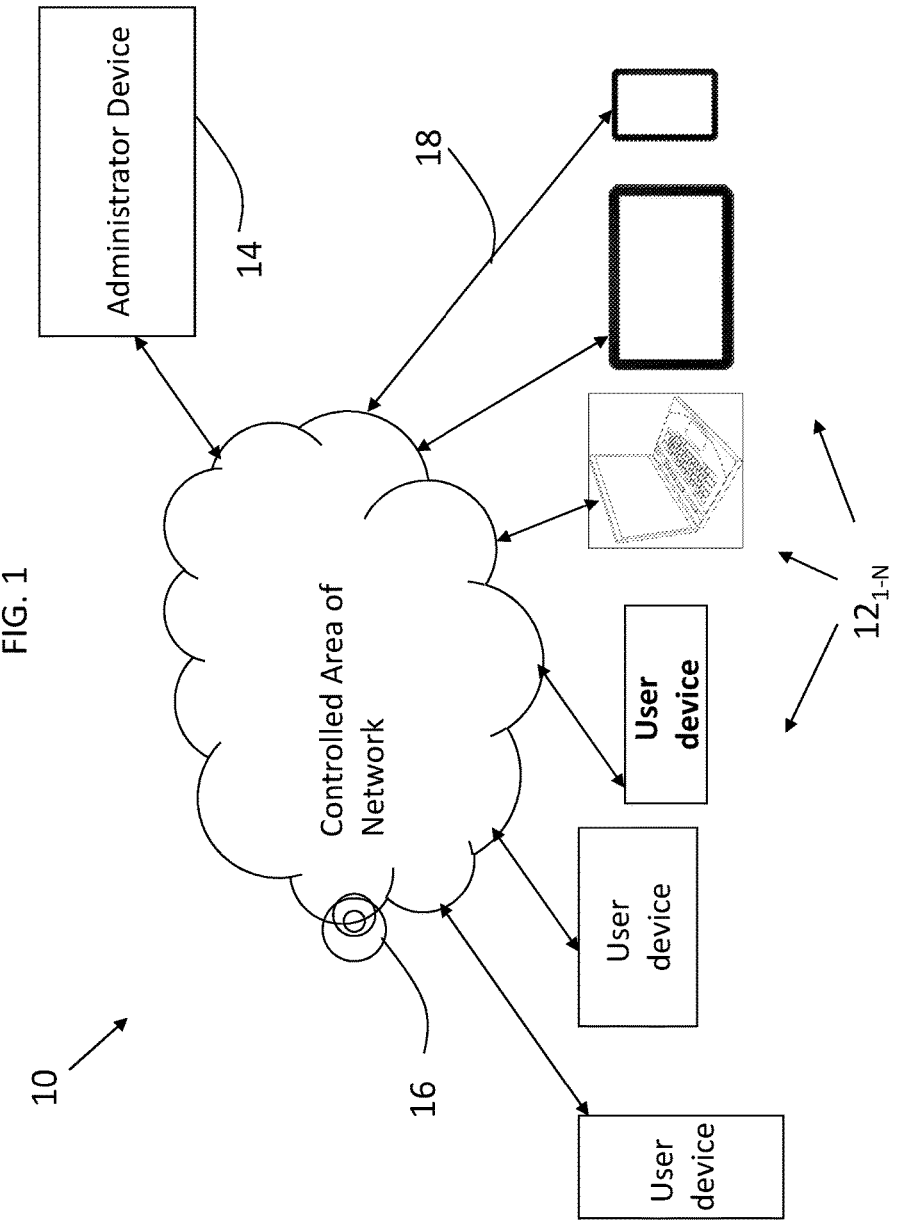
FIG. 1 illustrates exemplary mobile and portable device management system architectures according to an embodiment of the present disclosure.

FIG. 1 illustrates a block diagram of a computer network environment associated with a device management system ("DMS") 10 in accordance with various exemplary embodiments. In particular embodiments, the device management system 10 may allow an administrator to control the operation and use of applications residing on one or more mobile and portable user devices $12_{1-N}$ (N being a positive integer) via one or more administrator devices 14, when the user devices $12_{1-N}$ are near, on, or within controlled areas and networks 16.

Controlled areas and networks 16 may include any area or network in which an owner, operator, or other entity having control of the area or network desires to restrict access to and use of applications on user devices $12_{1-N}$ that are on or near their premises and networks. Controlled areas 16 may include any commercial and non-commercial, rental and owner occupied properties for any type of matter including personal, business, etc. Controlled networks 16 may be any network that an owner or operator of the network desires to control the use of applications on the network. The networks may support any number of personal or business tasks, such as email, exchange, application, authentication, directory, Virtual Private Network (VPN)/SSL gateways, firewalls, etc. that may be found in commercial and non-commercial properties, and which may be accessed locally or remotely by user devices $12_{1-N}$.

User devices $12_{1-N}$ generally include any mobile and portable electronic devices, such as basic and smart mobile phones, tablets, notebooks, personal digital assistants, laptops, game devices, etc. from any number of device companies. The user devices $12_{1-N}$ may communicate information on local and/or wide area networks managed by one or more service providers and/or by wired or wireless communication with other electronic devices.

The administrator device 14 may have various levels of communication with the user device 12 via communication links 18 depending upon the implementation of the DMS 10. For example, the communication could range from continuous to regular to periodic to infrequent depending upon the implementation of the DMS 10.

In various embodiments, the administrator device 14 provides for monitoring and control over one or more user devices $12_{1-N}$ that may interact with controlled areas or networks 16. The administrator device 14 may comprise a single device for small scale applications to multi-faceted networks managed via network operations centers for global-scale applications. The administrator device 14 may include servers and device management databases that provide inventory and other functions, which may or may not be physically located within the physical boundaries of the controlled area. The administrator device 14 may also include one or more hardware, firmware, and software components residing at one or more computer servers or systems in various forms, including but not limited to one or more integrated circuits (ICs), printed circuit boards (PCBs), fixed, mobile and portable devices including mobile telephones, tablets, other PDAs, laptop or notebook computers, distributed computer systems, computing grids, or servers.

Communication links 18 may include any suitable number or arrangement of interconnected networks including both wired and wireless networks. In various embodiments, network link 18 may include a variety of wireless communication channels and networks such as WLAN/WiFi, WiMAX, Wide Area Networks (WANs), Bluetooth, etc., as well as Ethernet and other wired connections that may be available for use by fixed, mobile, and portable user devices $12_{1-N}$ to communicate on or outside of the controlled areas and networks. The user devices $12_{1-N}$ may often be configured to communicate using a cellular-based communication infrastructure that includes cellular-based communication protocols such as 3G, 4G, 5G, AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others.

Figure 2:
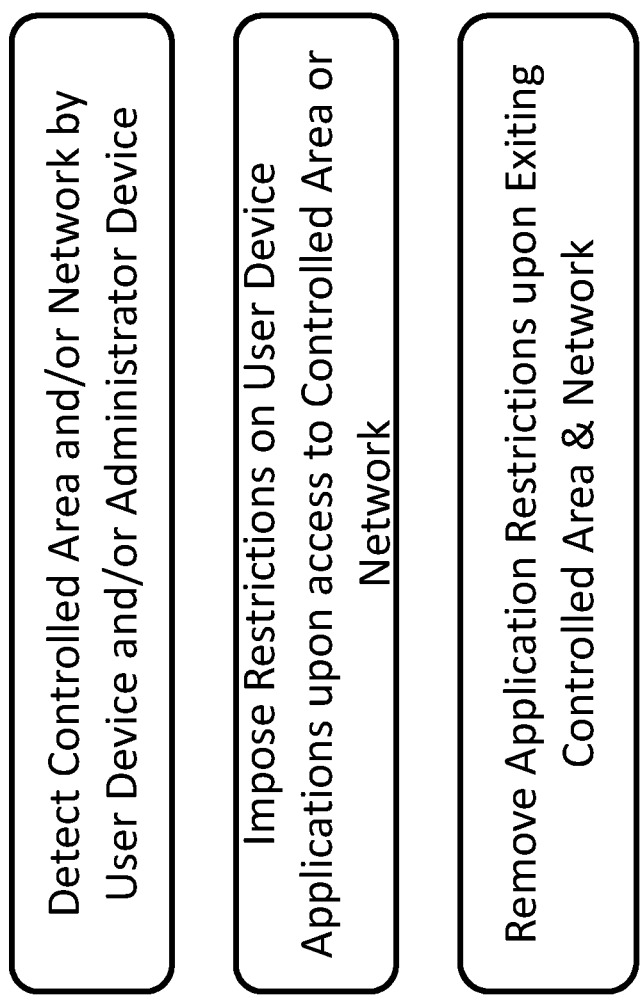
FIG. 2 is a schematic diagram illustrating exemplary processes of the present invention.

As illustrated in FIG. 2, in practice, the DMS 10 may detect controlled areas and networks via the user device 12 and/or administrator device 14. The DMS 10 may then impose or remove restrictions on one or more applications on the user devices $12_{1-N}$ upon access by the user devices $12_{1-N}$ to controlled areas or networks 16. When the user device 12 exits the controlled area and/or network 16, the DMS 10 may again remove or impose restrictions from applications on the user device 12.

The DMS 10 may include a DMS 10 user application that executes on the user device 12 and DMS 10 administrator application that executes on the administrator device 14. In some embodiments, the device management system 10 functions may be implemented almost entirely on the user device 12 in software and/or hardware with the DMS 10 user application having infrequent communication with DMS 10 administrator application on the administrator device 14. In other embodiments, the device management system 10 may be implemented on the user device 12 and an administrator device 14 in software and/or hardware with frequent communication and oversight by the DMS 10 administrator application. In various embodiments, the DMS 10 may only be implemented on the user device 12 in a manner that merely enables the DMS 10 running on the administrator device 14 to impose application restrictions and perform other tasks on the user devices $12_{1-N}$.

Figure 3:
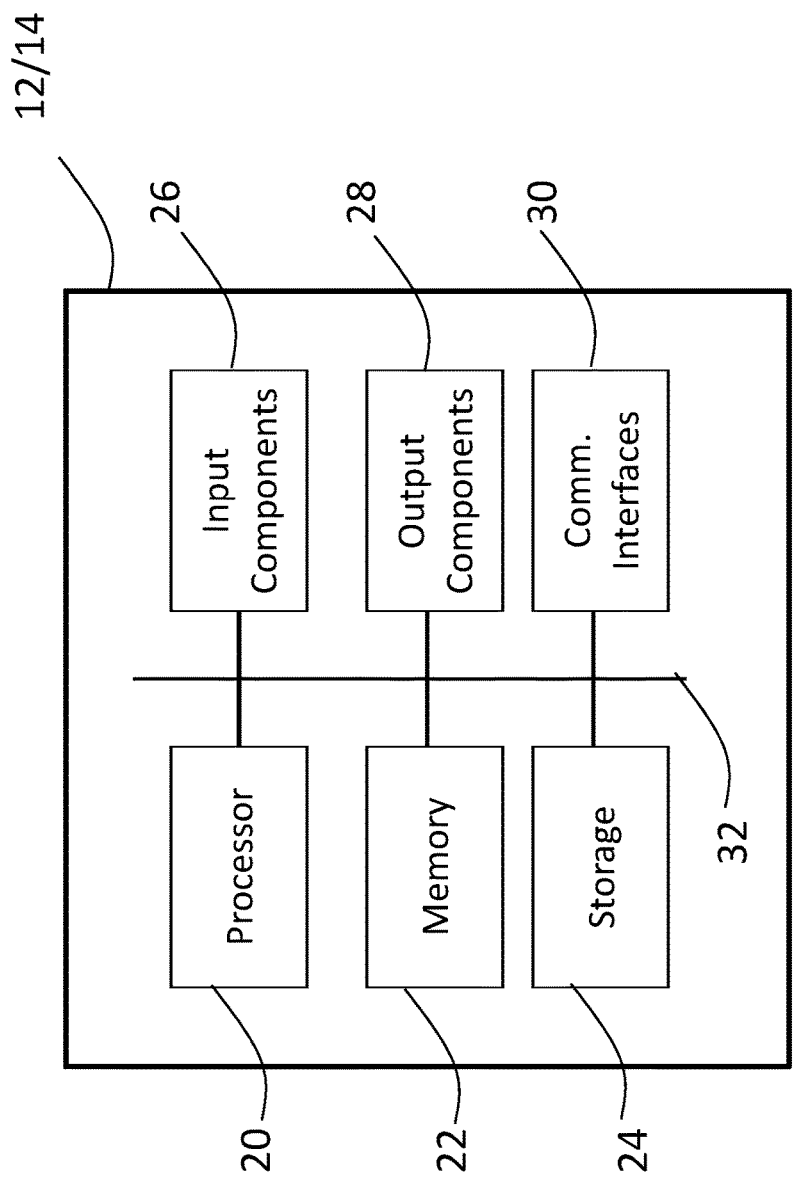
FIG. 3 is a schematic diagram illustrating exemplary user and administrator device component architectures.

FIG. 3 illustrates exemplary component embodiments of user devices $12_{1-N}$ and administrator devices 14. The devices may include one or more processors 20, memory 22, storage 24, input components 26, output components 28, communication interfaces 30, as well as other components that may be interconnected as desired by the skilled artisan via one or more buses 32.

Processor(s) 20 may include general-purpose processors central processing units (CPU), graphics processing units (GPU), accelerated processing units (APU), various microprocessors, and/or any processing component, such as field-programmable gate arrays (FPGA), application-specific integrated circuits (ASIC), etc., and combinations thereof that interprets and/or executes instructions. The processor 20 may contain a cache memory unit for temporary local storage of instructions, data, or computer addresses and may be implemented as a single-chip, multiple chips and/or other electrical components including one or more integrated circuits and printed circuit boards that implements and executes logic in hardware, in addition to executing software.

Software modules (executed on hardware) may be expressed in a variety of software languages (e.g., computer code), including C, C++, Java™, Javascript, Rust, Go, Scala, Ruby, Visual Basic™, FORTRAN, Haskell, Erlang, and/or other object-oriented, procedural, or other programming language and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code.

Processor(s) 20 may connect to another computer system or to telecommunications network as part of performing one or more steps of one or more processes described or illustrated herein, according to particular needs. Moreover, one or more steps of one or more processes described or illustrated herein may execute solely at the processor 20. In addition or as an alternative, one or more steps of one or more processes described or illustrated herein for the administrator device 14 may execute at multiple CPUs that are local or remote from each other across one or more networks.

Devices 12 and 14 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 22 may include a random access memory (RAM), a read only memory (ROM), and/or another type of dynamic or static storage device, such as flash, magnetic, and optical memory, etc. that stores information and/or instructions for use by processor 20. The memory 22 may include one or more memory cards that may be loaded on a temporary or permanent basis. Memory 22 and storage 24 may include a subscriber identification module (SIM) card and reader.

Storage component 24 may store information, instructions, and/or software related to the operation and use of user and administrator devices 12 and 14. Storage 24 may be used to store operating system, executables, data, applications, and the like, and may include fast access primary storage, as well as slower access secondary storage, which may be virtual or fixed.

Storage component 24 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate. The computer-readable medium may be a biological, chemical, electronic, electromagnetic, infrared, magnetic, optical, quantum, or other suitable medium or a combination of two or more such media, where appropriate. The computer-readable medium may include one or more nanometer-scale components or otherwise embody nanometer-scale design or fabrication. Example computer-readable media include, but are not limited to fixed and removable drives, application-specific integrated circuits (ASICs), CDs, DVDs, field-programmable gate arrays (FPGAs), floppy disks, optical and magneto-optic disks, hard disks, holographic storage devices, magnetic tape, caches, programmable logic devices (PLDs), random-access memory (RAM) devices, read-only memory (ROM) devices, semiconductor memory devices, solid state drives, cartridges, and other suitable computer-readable media.

Input components 26 and output components 28 may include various types of input/output (I/O) devices. The I/O devices often may include a graphical user interface (GUI) that provides an easy to use visual interface between the user and the user device 12 or administrator device 14 and access to the operating system or application(s) running on the devices.

Input components 26 receive any type of input in various forms from users or other machines, such as touch screen and video displays, keyboards, keypads, mice, buttons, track balls, switches, joy sticks, directional pads, microphones, cameras, transducers, card readers, voice and handwriting inputs, and sensors for sensing information such as temperature, location via global positioning system (GPS) or otherwise, accelerometer, gyroscope, actuator data, which may be input via a component in the device 12 and 14 or received via one or more communication interfaces 30.

Output component 28 may include displays, speakers, lights, sensor information. Similar to the input, the output may be provided via one or more ports and/or one or more communication interfaces 30.

Communication interface 30 may include one or more transceivers, receivers, transmitters, modulators, demodulators that enable communication with other devices, via wired and/or wireless connections. Communication interface 30 may include Ethernet, optical, coaxial, universal serial bus (USB), infrared, radio frequency (RF) including Wi-Fi, WiMax, cellular, Bluetooth, etc. as described herein and known in the art.

Bus 32 may connect a wide variety of other subsystems, in addition to those depicted in FIG. 3, and may include various other components that permit communication among the components in the user and administrator devices 12 and 14. The bus 32 may encompass one or more digital signal lines serving a common function, where appropriate, and various structures including memory, peripheral, or local buses using a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

The user device 12 and administrator device 14 may provide functionality as a result of the processors 20 executing software embodied in one or more computer-readable storage media residing in the memory 22 and/or storage 24 and logic implemented and executed in hardware. The results of executing the software and logic may be stored in the memory 22 and/or storage 24, provided to output components 28, and transmitted to other devices via communication interfaces 30. In execution, the processor 20 may use various inputs received from the input components 26 and/or the communications interfaces 30. The input may be provided directly to the processor 20 via the bus 32 and/or stored before being provided to the processor 20. Executing software may involve carrying out processes or steps may include defining data structures stored in memory 22 and modifying the data structures as directed by the software.

In various implementations, the device management system 10 may impose restrictions on the user device 12 that may include, for example, one or more of:

disabling/enabling applications on a user device,
  preventing applications on the user device 12 from being enabled,
  allowing applications on the user device 12 to be enabled,
  deleting/activating applications on the user device,
  limiting or preventing applications from being downloaded, and/or
  performing an inventory of applications on the user device 12.

When a restriction is imposed on an application, the DMS 10 may take one or more actions to alter the appearance of access options to the application. For example, the DMS 10 may hide icons, shortcuts, and other access options to the application, or "grayed" out options, or not alter the appearance, etc. depending upon whether the user device is inside or outside the controlled areas or on or off the controlled networks.

When the user device 12 is no longer in, on, and/or around their facilities and/or networks 16, the device management system 10 may remove or impose the restrictions on the user device 12. However, if the DMS 10 deletes an application, the DMS 10 may, or may not reinstall the deleted applications.

Figure 4:
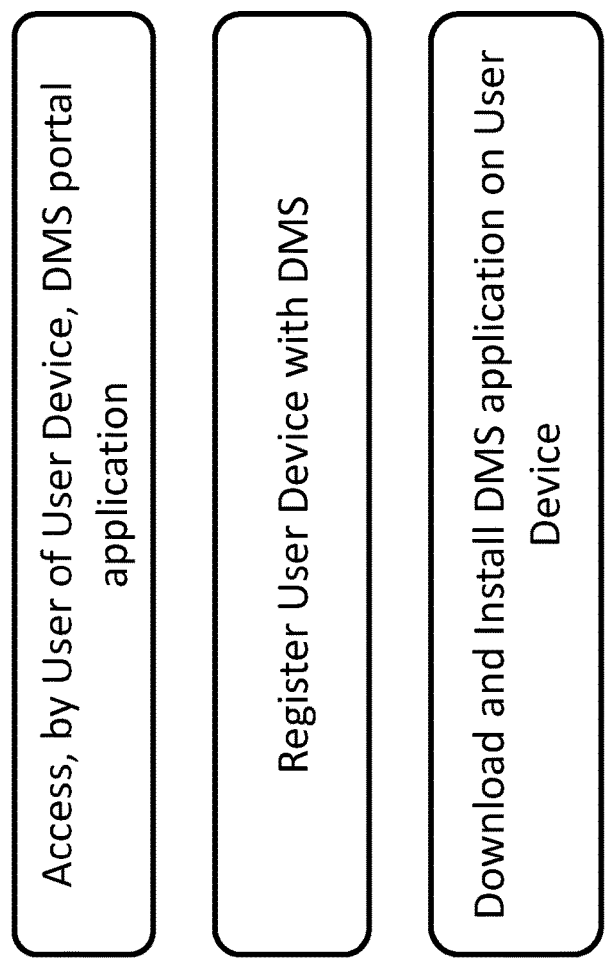
FIGS. 4-7 are schematic diagram illustrating exemplary processes of the present invention.

As illustrated in FIG. 4, the DMS 10 may be implemented via a DMS 10 portal associated with the administrator device 14 that enables user devices $12_{1-N}$ to be registered with the DMS 10 and establish a user account and profile for the user device 12, preferably before the user device 12 is allowed access the controlled area or network 16. The DMS 10 portal may also be used to update user information and engage the DMS 10 when new applications have been added to the user device 12. The DMS 10 portal may be linked to other information concerning the user and the user device 12. For example, the user device 12 may be registered under a first user and the user device 12 may have different restrictions if the user device 12 is possessed by a second user different from the first user. Owner/operators may impose different restrictions depending upon the type of user, such as employees, visitors/guests, frequent and infrequent customers, etc.

Figure 5:
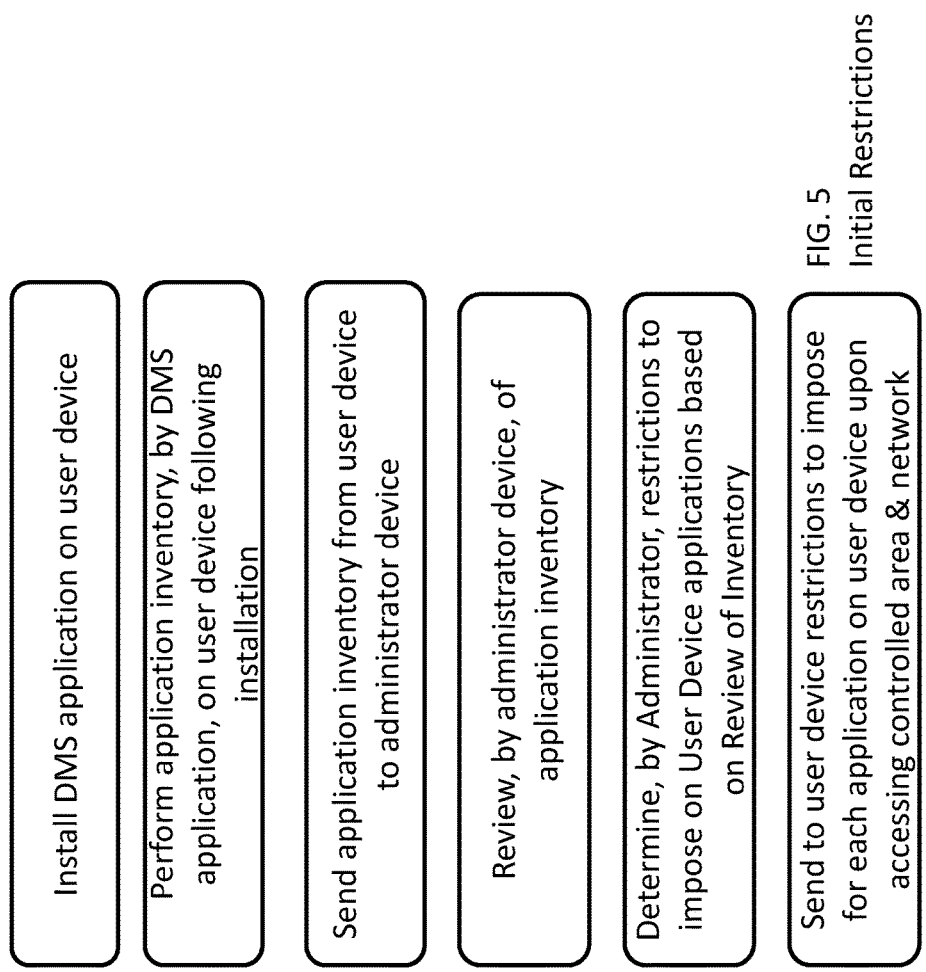

FIG. 5 depicts exemplary processes involving the installation and imposition of application restrictions by the DMS 10 on the user device 12. After registration of the user device 12, the DMS 10 user application may be installed on the user device 12. Following installation on the user device 12, the DMS 10 may perform an application inventory on the user device 12. The application inventory may be sent from user device 12 to administrator device 14. The inventory may be reviewed by administrator device 14. The administrator device 14 may determine restrictions to impose on applications based on review of application inventory. The application restrictions may be sent to user device 12 from the administrator device 14. The DMS 10 may impose the application restrictions on each application when user device 12 attempts to access or depart from controlled areas and/or networks 16.

Figure 6:
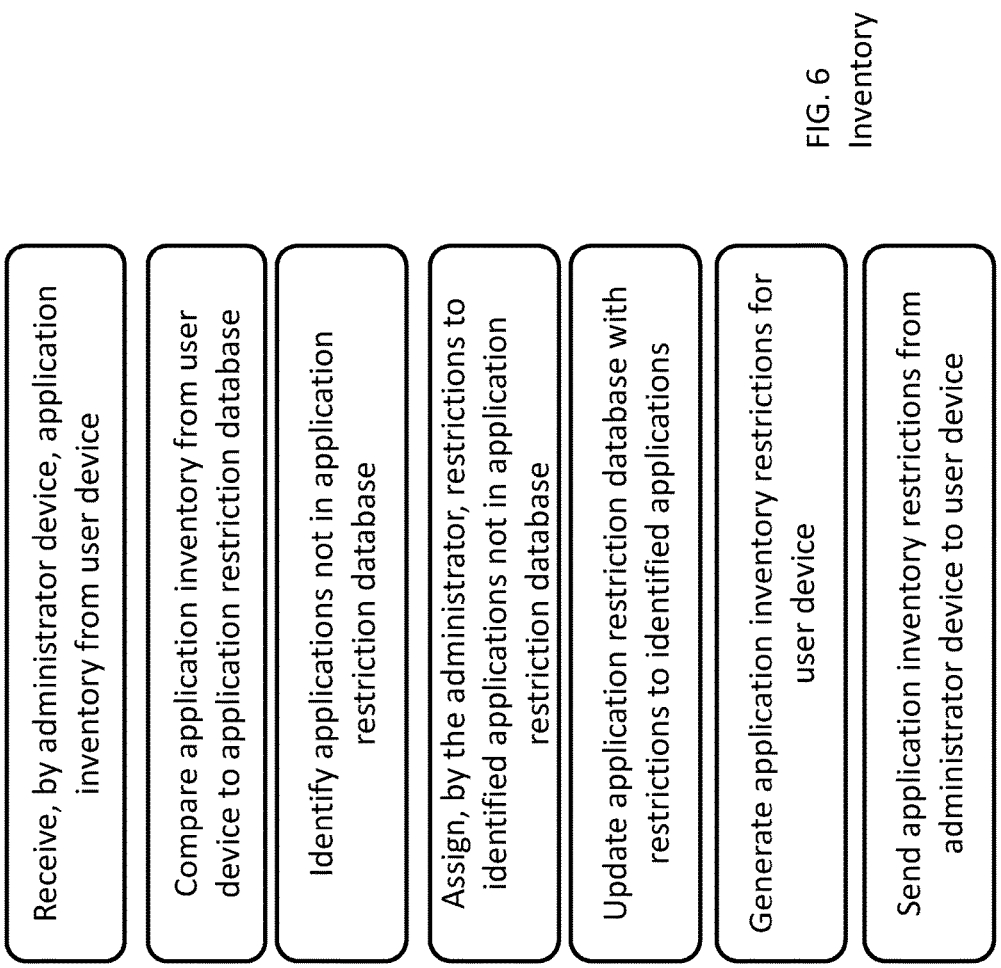

FIG. 6 depicts exemplary processes involving the review of the application inventory that may be sent from the user device 12 by the administrator device 14. The administrator device 14 may receive application inventory from the user device 12. The administrator device 14 may compare the application inventory from user device 12 to an application restriction database, which may be a part of the administrator device 14, but may comprise separate hardware that is either local or remote from other hardware in the administrator device 14. The administrator device 14 may identify applications that are not in the application restriction database. The administrator may assign restrictions to identified applications not in application restriction database. In various embodiments, an application not in the application restrictions database may be assigned a default restriction, such as blacklist, and the administrator may be notified of the identified application(s) for review. Upon assignment, either by default or by the administrator, the identified applications may be added to the application restriction database. The administrator device 14 may generate application inventory restrictions for user device 12. The administrator device 14 may send application inventory restrictions from administrator device 14 to user device 12.

An administrator may choose to restrict specific applications, various classes of applications, and/or all applications on the user device 12 via the administrator device 14. Exemplary types of applications that the administrator may want to restrict may include communication applications, such as some or all of the wireless and/or wired communications capabilities, email, text, and other messaging applications, camera, audio or video recorder, and other information replicating applications, gaming and other entertainment applications, applications that may be considered inappropriate in the controlled areas or networks, etc. The administrator also may choose to restrict the use of all output components 28 and/or some input components 26, while the user device 12 is within the controlled area or on the controlled network 16.

The DMS 10 may also review the application inventory to determine if any required applications are missing from the user device 12. The DMS 10 may act to install applications that are required for use, when the user device 12 is inside or outside the controlled area and/or on or off controlled networks.

The device management system 10 may be configured to impose application restrictions on the user device 12 automatically and/or manually by prompting the user to take action. For example, the DMS 10 may immediately impose restrictions upon the user device whenever the user device 12 attempts to access or depart from the controlled area and/or network 16. For some applications, it may be desirable to prompt the user for action or information before disabling or enabling the applications. For example, the prompt may inform the user that "This application and all associated data will be automatically deleted from this device, if you attempt to access controlled area or networks." Persons skilled in the art of network management and information technology will appreciate the many types of alerts and notices that may be implemented in the DMS 10.

The administrator device 14 may often provide the administrator(s) with menu driven interfaces to the DMS 10 that enables the administrator(s) to set the restrictions on usability for each application on various bases, such as application, individual, group, etc. For example, the administrator may establish various general levels of permission concerning applications on user devices $12_{1-N}$, such as:
  white list applications with unrestricted use,
  black list applications that are not allowed to be used,
  gray list applications that have some restrictions on use, and
  banned list applications that are deleted upon detection.

The administrator may decide to group applications into different levels of gray lists depending upon the type of use restrictions or apply restrictions individually to applications. Unknown applications may be automatically blacklisted or have another default restriction applied. The administrator may then review and assign a desired level of restriction to the application.

Restriction determinations made for an application inventoried for a first user device 12 may be applied to second, third, fourth, etc. user devices $12_{1-N}$ as those applications are encountered. However, as noted, application restriction may be tailored to individual user devices $12_{1-N}$ or group of user devices $12_{1-N}$ depending upon various factors, such as owner, resident, employee job, customer status, etc., as determined by the administrator.

The application restrictions database may also serve various other functions, such as accumulating statistics on applications residing user devices $12_{1-N}$. In various instances, application inventory from a multitude of user devices $12_{1-N}$ encountered by the controlled areas and networks may enable an owner/operator to provide additional products and services to the users.

Figure 7:
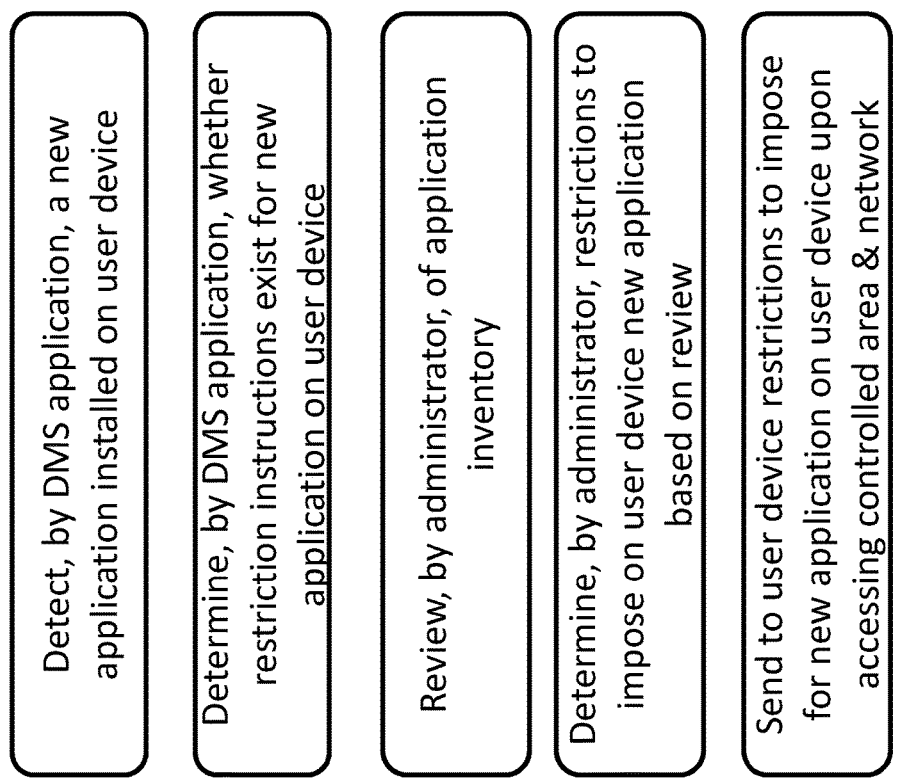

FIG. 7 illustrates processes that may be performed by the DMS 10 when a new application is detected to the user device 12. The DMS 10, on the user device 12 and/or administrator device 14, detects that a new application is installed on user device 12. New application detection may be performed by a periodic inventory of the user device 12 or by download or installation detection by the DMS 10 user application. The DMS 10, on the user device 12 and/or administrator device 14, determines whether restriction instructions exist for the new application on the user device 12. If the DMS 10 already has restriction instructions for the new application, the DMS 10 will impose those restrictions when the user device 12 attempts to access controlled areas and networks 16. If restriction instructions are not available for the new application, the application may be identified for review by the administrator, and default restrictions may be applied until the review is performed and application specific restrictions are established by the administrator for the new application. The administrator device 14 determines restrictions to impose on the user device 12 for the new application based on review. The restriction instructions for the new application may be sent to the user device 12 to impose on the user device 12 upon accessing controlled areas and networks 16.

Detection of the user device 12 when it attempts to access controlled networks 16 can be performed by methods well known to the skilled artisan. The detection by the DMS 10 may be made by the user device 12 and/or the administrator device 14. For example, the device management system 10 running on the user device 12 may monitor the networks in the range of the user device 12 and/or the geographic location of the user device 12. For example, when the user device 12 detects one or more controlled networks, the device management system 10 application running on the user device 12 may impose restrictions that have been established for that network. Similarly, when the DMS 10 determines that the user device 12 is within a predetermined range of controlled areas and networks 16 via GPS, cellular triangulation, or other location detection means, the device management system 10 may impose the established restrictions for that controlled area 16. Detection of user device 12 may include one or more of receiving a connection request or message from the user device 12 including a MAC address or other device identifier, the user device receiving a controlled network or area identifier, and, determining location information associated with the user device indicating the user device in or near the controlled area or on the controlled network.

It will be appreciated that the device management system 10 may also impose different restrictions tailored to different locations within the controlled area and part of the controlled network. For example, some applications may not be disabled in a parking lot in the controlled area, but those applications may be disabled within some or all buildings in the controlled area 16.

In various embodiments, the controlled area may be defined by geographic coordinates and/or electronically using a geo-fence. The geo-fence may or may not be considered part of the administrator device. The geo-fence may be part of the controlled network or may be a separate network that functions to define some or all of the geo-fence for the controlled area.

Figure 8:
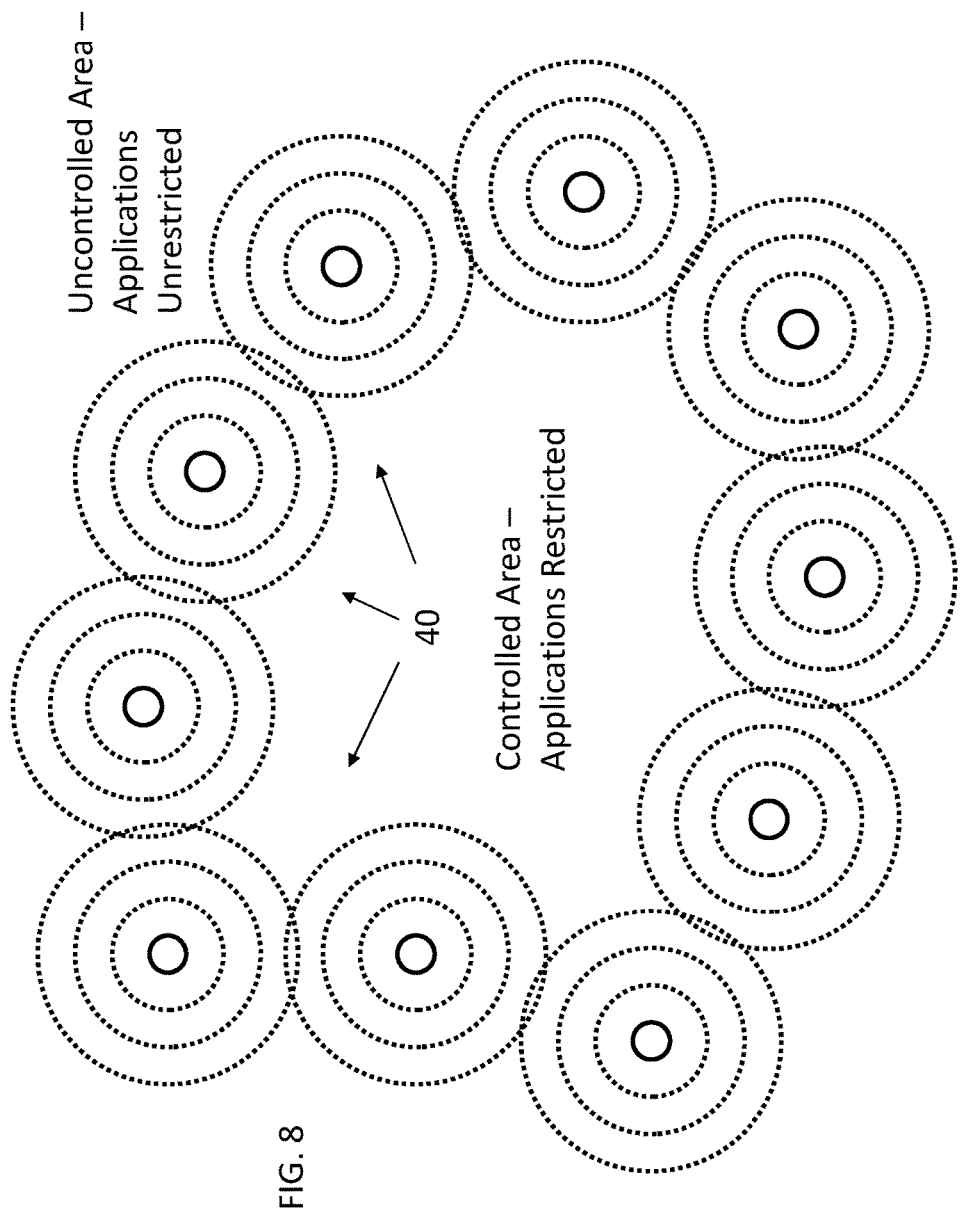
FIG. 8 is a schematic diagram illustrating exemplary controlled area embodiments.

For example, as illustrated in FIG. 8, the geo-fence may be defined by a series of beacons 40 that transmit network identifiers and/or receive identifying information from user devices $12_{1-N}$ in proximity to the beacons 40. When the user device 12 detects one or more beacons 40 associated with controlled areas or networks, the DMS 10 may impose any established restrictions with or without communication with the administrator device 14. Similarly, when the administrator device 14 detects the user device 12 via one or more beacons 40, the administrator device 14 may impose application restrictions on the user device, send DMS 10 information to the user device 12, and/or request the DMS 10 on the user device 12 to take certain actions, such as to confirm that the DMS 10 software and/or restrictions are up to date.

In operation, the user may be required by an owner and/or operator of the controlled area or network 16 to install the DMS 10 user application on the user device 12 as a condition of accessing the controlled area or network 16. The administrator device 14 may be configured to monitor and detect user devices $12_{1-N}$ that do not have the DMS 10 application on the user device 12 and initiate actions to limit the functionality of the user device 12 until the DMS 10 application is installed and/or to assist the owner/operator with locating the user device 12 in the controlled area 16. Actions may include denying network access to the user device 12 that does not include the DMS 10 application or permissions or is not registered with the administrator.

It will be appreciated that the DMS 10 may or may not be a stand-alone application. For example, the DMS 10 may be integrated into the device operating system or included with other applications, such as security, etc. It will be further appreciated that the DMS 10 may be configured to perform other functions on the user device, such as monitor activity including apps that are running, communications, install updates, deliver user specific content including information relevant to their presence in the controlled area or network, marketing, etc. In various embodiments, the DMS 10 may monitor the security state of one or more mobile devices and set indicators related to such security state. Enterprise network applications, such as an email application, may access the security state information when making access control decisions with respect to a user device 12. The DMS 10 may log file system commands, and other data characterizing usage of, and/or the actions performed on, the user device 12 and receive data, commands, and other messages from the administrator device to synchronize the state of the user device 12 with a corresponding user device 12 object stored in a device management database.

One of skill in the art will appreciate that the present invention may also be applicable to fixed user devices 12. However, many of the challenges associated with mobile and portable user devices $12_{1-N}$ may not arise with devices that are fixed within the controlled areas or on controlled networks and fixed devices that are moved may be considered portable as described herein.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The presence or absence of a summary, abstract, or claims in this application should in no way be considered as limiting on the scope of any inventions disclosed herein.

What is claimed is:

1. A system comprising:
an administrator device including at least one processor running a device management system administrator application to:
communicate with a user device;
detect when the user device attempts to access a controlled area or controlled network by receiving a connection request or message from the user device including a MAC address or other device identifier; and
determining location information associated with the user device indicating the user device is in or near the controlled area or on the controlled network;
perform an inventory of applications on the user device;
identify restrictions for each application when the user device is in the controlled area or on the controlled network,
the restrictions associated with
a white list for applications with unrestricted use, and at least one of
a black list for applications that are not allowed to be used,
a gray list for applications that have some restrictions on use, and
a banned list for applications that are deleted upon detection;
assign each application to a list based on the identified restrictions;
impose the identified restrictions for each application on the user device when the user device accesses the controlled area or network; and
remove the identified restrictions on the applications on the user device when the user device is no longer accessing the controlled area or network.

2. The system of claim 1, where:
the user device includes memory and at least one processor coupled to the memory, to:
detect when the user device is accessing the controlled area or network,
impose restrictions on the one or more applications on the user device received from the device management system administrator application, when the user device accesses the controlled area or network, and
remove the restrictions on the more one or more applications on the user device, when the user device is no longer accessing the controlled area or network.

3. The system of claim 1, where the restrictions include one or more of:
disabling applications on the user device;
preventing applications on the user device from being enabled;
enabling applications on the user device;
enabling features in applications on the user device;
deleting applications on the user device; and,
limiting or preventing applications from being downloaded on the user device.

4. The system of claim 1, where user device is detected via a geofence in communication with the device management system administrator application.

5. The system of claim 1, where, when imposing restrictions, the at least one processor to:
compare the application inventory to an application restriction database;
identify applications not in the application restriction database;
assign default restrictions to applications not in the application restriction database; and
apply default restrictions and restrictions in the application restriction database to the applications on the user device.

6. A method comprising:
communicating, via an administrator device including at least one process executing a device management system administrator application, with a user device;
detecting, by device management system administrator application, when the user device attempts to access a controlled area or network;
detecting the user device includes one or more of:
receiving a connection request or message from the user device including a MAC address or other device identifier;
receiving, by the user device, a controlled network or area identifier; and,
determining location information associated with the user device indicating the user device is in or near the controlled area or on the controlled network;
performing, by device management system administrator application, an inventory of applications on the user device;
identifying, by device management system administrator application, restrictions for each application when the user device is in the controlled area or on the controlled network;
the restrictions associated with
a white list for applications with unrestricted use, and at least one of
a black list for applications that are not allowed to be used,
a gray list for applications that have some restrictions on use, and
a banned list for applications that are deleted upon detection;
assigning, by device management system administrator application, each application to a list based on the identified restrictions;
imposing, by device management system administrator application, the identified restrictions for each application on the user device when the user device accesses the controlled area or network; and
removing, by device management system administrator application, the identified restrictions on the applications on the user device when the user device is no longer accessing the controlled area or network.

7. The method of claim 6, where the restrictions include one or more of:
disabling applications on the user device;
preventing applications on the user device from being enabled;
enabling applications on the user device;
enabling features in applications on the user device;
deleting applications on the user device; and,
limiting or preventing applications from being downloaded on the user device.

8. The method of claim 6, where removing restrictions does not include re-installation of applications that have been deleted.

9. The method of claim 6, where detecting the user device includes one or more of:
receiving a connection request or message from the user device including a MAC address or other device identifier;
receiving, by the user device, a controlled network or area identifier; and,
determining location information associated with the user device indicating the user device is in or near the controlled area or on the controlled network.

10. The method of claim 6, where imposing restrictions includes one or more of:
performing an application inventory of the user device;
comparing the application inventory to an application restriction database;
identifying applications not in the application restriction database;
assigning default restrictions to applications not in the application restriction database; and
applying default restrictions and restrictions in the application restriction database to the applications on the user device.

11. The method of claim 6, where imposing and removing restrictions on the application is performed by the user device.

12. A non-transitory computer readable medium storing instructions, the instructions comprising:
one or more instructions which, when executed by at least one processor, cause the at least one processor to:
communicate with a user device;
detect when the user device attempts to access a controlled area or controlled network by
receiving a connection request or message from the user device including a MAC address or other device identifier;
determining location information associated with the user device indicating the user device is in or near the controlled area or on the controlled network;
perform an inventory of applications on the user device;
identify restrictions for each application when the user device is in the controlled area or on the controlled network;
the restrictions associated with
a white list for applications with unrestricted use, and at least one of
a black list for applications that are not allowed to be used,
a gray list for applications that have some restrictions on use, and
a banned list for applications that are deleted upon detection;
assign each application to a list based on the identified restrictions;
impose the identified restrictions for each application on the user device when the user device accesses the controlled area or network; and
remove the identified restrictions on the applications on the user device when the user device is no longer accessing the controlled area or network.

13. The non-transitory computer readable medium of claim 12, where the restrictions include one or more of:
disabling applications on the user device;
preventing applications on the user device from being enabled;
enabling applications on the user device;
enabling features in applications on the user device;
deleting applications on the user device; and,
limiting or preventing applications from being downloaded on the user device.

14. The non-transitory computer readable medium of claim 12, where removing restrictions does not include re-installation of applications that have been deleted.

15. The non-transitory computer readable medium of claim 12, where the one or more instructions, when executed by the at least one processor, further cause the at least one processor to:

compare the application inventory to an application restriction database;

identify applications not in the application restriction database;

assign default restrictions to applications not in the application restriction database; and apply default restrictions and restrictions in the application restriction database to the applications on the user device.

16. A non-transitory computer readable medium storing instructions, the instructions comprising:

one or more instructions which, when executed by at least one processor, cause the at least one processor to:

communicate with a user device;

detect when the user device attempts to access a controlled area or network;

perform an inventory of applications on the user device;

compare the inventory of applications to an application restriction database;

identify applications not in the application restriction database;

assign default restrictions to applications not in the application restriction database;

identify restrictions for each application when the user device is in the controlled area or on the controlled network;

the restrictions associated with
- a white list for applications with unrestricted use, and at least one of
- a black list for applications that are not allowed to be used,
- a gray list for applications that have some restrictions on use, and
- a banned list for applications that are deleted upon detection;

assign each application to a list based on the identified restrictions;

impose the identified restrictions for each application on the user device when the user device accesses the controlled area or network; and remove the identified restrictions on the applications on the user device when the user device is no longer accessing the controlled area or network.

* * * * *